United States Patent [19]

Adderley et al.

[11] Patent Number: 5,323,953
[45] Date of Patent: Jun. 28, 1994

[54] PRESSURISED STORAGE FOR GASES

[75] Inventors: Colin I. Adderley, Derby; John O. Fowler, Lancashire; Simon A. Banks, Derby; James E. Boardman, Lancashire, all of England

[73] Assignees: Rolls-Royce plc, London; Rolls-Royce and Associated Ltd., Derby, both of England

[21] Appl. No.: 921,102

[22] Filed: Jul. 29, 1992

[30] Foreign Application Priority Data

Jul. 29, 1991 [GB] United Kingdom ............... 9116317

[51] Int. Cl.$^5$ ................ B23K 20/00; B23K 31/00; B23K 101/12
[52] U.S. Cl. .................. 228/157; 228/184; 228/190; 220/501; 220/581
[58] Field of Search ............ 228/157, 184, 190, 193; 220/581, 501, 555, DIG. 11

[56] References Cited

U.S. PATENT DOCUMENTS

| 2,957,234 | 10/1960 | Valyi . | |
|---|---|---|---|
| 3,194,309 | 7/1965 | Adams . | |
| 3,927,817 | 12/1975 | Hamilton et al. | 228/157 |
| 4,292,375 | 9/1981 | Ko | 228/157 |
| 4,331,284 | 5/1982 | Schultz et al. | 228/157 |
| 4,598,450 | 7/1986 | Thompson et al. | 228/157 |
| 4,811,890 | 3/1989 | Dowling et al. | 228/157 |
| 4,916,027 | 4/1990 | DelMundo | 228/118 |

FOREIGN PATENT DOCUMENTS

| 0414435 | 2/1991 | European Pat. Off. . |
| 0460872 | 12/1991 | European Pat. Off. . |
| 1264149 | 8/1961 | France . |
| 1378421 | 12/1974 | United Kingdom . |

OTHER PUBLICATIONS

Machine Moderne No. 858, Sep. 1981, Paris FR pp. 87-89 Formage super-plastique: feu vert pour les alliages de titane p. 87, translation enclosed.

Primary Examiner—Samuel M. Heinrich
Attorney, Agent, or Firm—Cushman, Darby & Cushman

[57] ABSTRACT

A compressed gas storage tank comprises a multi-layer sheet metal sandwich structure with a predetermined pattern of solid state diffusion bonds between all the neighbouring layers. After the sheets have been solid state diffusion bonded together in the flat condition, the tank is blow formed between dies under superplastic forming conditions to produce at least one superplastically expanded core layer for containing the compressed gas. The configuration of the core layer is determined by the diffusion bond pattern. The expanded core layer provided internal bracing for the tank to give in rigidity and enable it to withstand the high internal pressures.

19 Claims, 6 Drawing Sheets

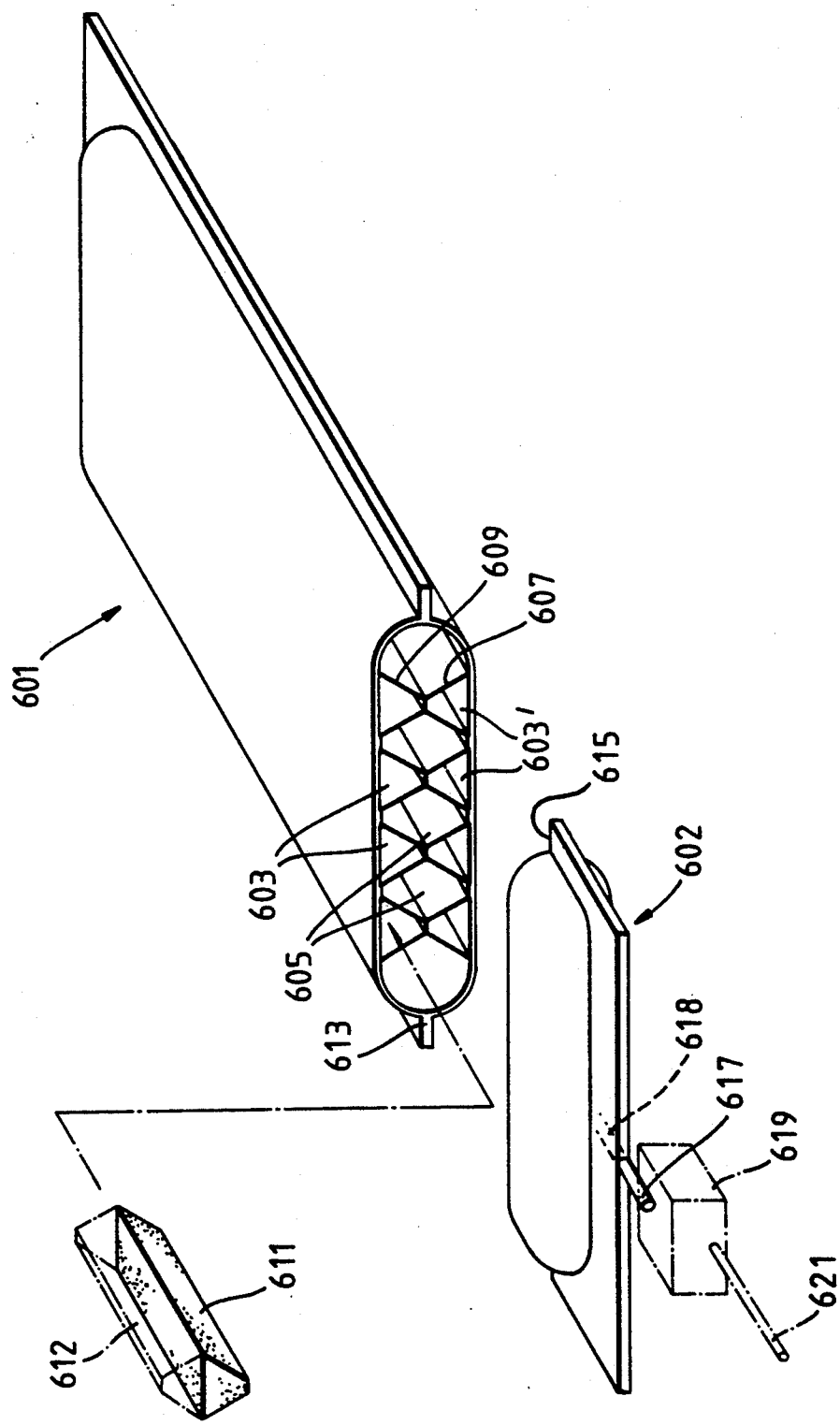

PRESSURISED STORAGE FOR GASES

BACKGROUND OF THE INVENTION

The present invention relates to pressurised gas storage vessels and methods of manufacturing them. It is particularly, but not exclusively, concerned with fuel gas storage vessels.

FIELD OF THE INVENTION

Combustible gases are used as fuel for various types of power units, such as internal combustion engines, gas turbines and fuel cells. When stored gases are used as fuels in this way, they are usually stored under pressure in order that the amount of gas so stored is sufficient to supply the power unit for an adequate period of time.

DESCRIPTION OF THE RELATED ART

Commonly, gas is stored in spherical or cylindrical vessels because of their inherent abilities to resist internal pressures. The degree of pressurisation of such vessels, necessary to store a given amount of gas as measured at standard pressures and temperatures, can be reduced by filling their interiors with an adsorbent medium, such as activated charcoal. The requirement is for a highly porous medium which has a very high internal surface area and which attracts the gas molecules to its surfaces. However, where space is restricted, as in vehicles of various kinds for surface, subsurface, air or space transportation, spherical or cylindrical gas storage vessels can often be an inconvenient and inefficient use of the available space. Furthermore, such storage vessels are not ideally shaped for easy packing with blocks of adsorbent media. Note that blocks are preferred to granulated or powdered media due to the tendency of fines in granules and powders to flow with the gas out of the vessel and block filters in the gas transport lines.

Various expedients have been tried in order to produce gas storage vessels which are of a more convenient shape or which make better use of available space. For example, blocks of metal have been provided with arrays of bored out cylindrical holes connected to a common gas manifold. Arrays of small diameter tubes have also been used in similar manner. Both of these expedients have been utilised to construct storage vessels which conform more nearly to the available space or the shape of the vehicle, but both forms of construction make inefficient use of their internal volumes and are expensive to construct. Again, flat or conformably shaped gas storage tanks have been made using a welded, quilted form of construction, but manufacturing costs are high and the technique again fails to maximize the useable internal volume of the vessel.

In the field of aerospace structures it is known to utilise diffusion bonding and superplastic forming to transform a stack of suitable metallic sheets into a high strength structurally integral sandwich structure with an expanded cellular or compartmented core which cross-braces the outer skins of the sandwich to provide high resistance to deformation. It is found that provided precautions are taken during the manufacturing process to create and preserve a high state of cleanliness in the sheet surfaces to be joined and formed, the process creates a structure with very high strength and integrity.

For examples of typical prior art diffusion bonding and superplastic forming techniques useful for producing expanded metallic sandwich structures in an aerospace context, reference should be made to U.S. Pat. No. 3,927,817 (Hamilton et al), among many other patents granted in this field.

Due to the versatility of this particular joining and forming technology, structures can be produced easily in many different shapes—for example, flat structures, structures which conform to a vehicle body shape, or structures which can be part of a vehicle's own structure.

As an example of such prior art, U.S Pat. No. 4,916,027 (DelMundo) discloses a high strength insulating casing for a rocket fuel tank, and a process for making it. The fuel tank casing has an expanded cell core structure for combined rigidity and light weight and is made by a diffusion bonding and superplastic forming process. The interior compartments of the casing are said to be evacuatable to increase insulation of the fuel.

Another field to which diffusion bonding and superplastic forming technology for sandwich structures has been applied is that of heat exchangers, in which the expanded core compartments are utilised as heat exchange passages with flow of heat exchange media therethrough. An example of this is published as European patent application number 0414453, to which reference should be made for details of various possible core configurations and modes of manufacture.

SUMMARY OF THE INVENTION

It is an object of the present invention to enable the production of gas storage vessels which overcome or ameliorate the problems mentioned above in connection with gas storage by utilising the diffusion bonding and superplastic forming technology to which reference has just been made.

A related object of the invention is to enable the design of gas storage vessels with internal structures which easily accommodate prefabricated blocks of adsorbent material.

A further object of the invention is to enable the design of light weight gas storage vessels with inherent strength sufficient for use as part of a vehicle's structure if desired.

Accordingly, the present invention contemplates a multi-layer sheet metal structure including at least one superplastically expanded sheet metal core layer (the other layers may or may not have undergone a superplastic forming process), the structure having predetermined patterns of solid state diffusion bonds between all adjacent sheet metal layers, the at least one expanded core layer defining a plurality of compartments within the structure and internally bracing the structure to provide it with high resistance to deformation, characterised by use of the structure as a compressed gas storage vessel, the compressed gas being stored in the compartments. To facilitate such storage, the outer boundary of the structure is penetrated by at least one inlet/outlet passage in flow communication with the compartments to allow charging of the structure with compressed gas and discharging of compressed gas from the structure.

In this way, the invention provides a high strength gas tank which is relatively cheaply and easily made from an integrally formed sheet metal sandwich structure.

When used in accordance with our invention as pressurised gas storage vessels, such structures make very efficient use of their internal volume for storage of gas at medium to high pressures. For example, it is found that our invention enables vessels to be produced with thin flat sections, or with two dimensional or three dimensional curvatures, in which the ratio of diffusion bond area to the total surface area of the bonded surfaces is less than 1:7, yet such vessels are still strong enough to contain pressures of 40–200 bar or more.

Although the term "gas" is used extensively in the present specification as the name of the fuel or other substance to be stored under pressure, it should be understood as including the liquid or multi-phase state in respect of gases which liquify when cooled or when compressed above normal atmospheric pressure.

It should be noted that in the above mentioned patent to DelMundo, the interior compartments of the fuel tank casing are said to be evacuated to increase insulation of the fuel held in the tank, whereas our invention relates to the contrary concept of storing pressurised fuel within such compartments of the structure. Neither of the other prior art references suggest that the structures disclosed therein could be useable to store pressurised fuel of any sort.

Alternatively stated, the present invention provides a compressed gas storage vessel comprising a multi-layer sheet metal structure including at least one superplastically expanded sheet metal core layer (again, the other layers may or may not have undergone a superplastic forming process), the structure having predetermined patterns of solid state diffusion bonds between adjacent sheet metal layers, the at least one expanded core layer defining a plurality of compartments within the vessel for containing the compressed gas and internally bracing the structure to enable it to withstand internal pressurisation, the vessel having inlet/outlet flow means in flow communication with the compartments to facilitate charging and discharging of the vessel with the compressed gas. The core compartments of such vessels may contain gas adsorbent material, such as activated carbon. Such material is preferably present as blocks conforming to the cross sectional shape of the compartments, given suitable configuration of the expanded core layer(s).

Preferably, the predetermined patterns of solid state diffusion bonds between adjacent sheet metal layers include a peripheral edge region in which all the sheet metal layers are diffusion bonded together to form a solid flange extending around the vessel. The inlet/outlet flow means may comprise passage means extending through the solid flange.

Adjacent compartments in the at least one expanded core layer will usually have connection means for allowing free passage of gas therebetween.

The superplastically expanded core layer may have different configurations as determined by the patterns of diffusion bonding between the sheet metal layers.

One advantageous configuration for the structure of the vessel, particularly when blocks of adsorbent medium are to be inserted into it, is a Warren girder type of construction. Here, the at least one expanded core layer comprises linear corrugations whose extremities are solid state diffusion bonded to the adjacent sheet metal layers, the sides of the corrugations forming regularly spaced webs extending between the adjacent sheet metal layers at predetermined angles relative thereto, adjacent webs defining long compartments between themselves to contain the gas. The webs should of course be apertured to allow free passage of gas between adjacent compartments, unless it is desired to store different gases, or gas at different pressures, in different compartments.

There may be at least two superplastically expanded core layers defining at least two tiers of compartments over at least part of the extent of the vessel.

Another advantageous configuration for the at least one expanded core layer in terms of giving rigidity to the vessel and enabling it to withstand internal pressurisation, but which is not suitable for insertion of blocks of adsorbent material, comprises regularly spaced upstanding protrusions extending from both its sides, the protrusions being of hollow cross section normal to their extension and their extremities being solid state diffusion bonded to the neighburing sheet metal layers to define compartment means on both sides of the core layer.

Any of the above variations may be configured to have two superplastically expanded core layers separated by a further sheet metal layer situated therebetween.

A particularly preferred embodiment of the invention utilises a variation of the Warren girder type of expanded core structure. In this embodiment the vessel comprises two superplastically expanded core layers and two further layers comprising the outer walls of the vessel, the two middle sheet metal layers being diffusion bonded to each other in a predetermined linear bonding pattern and each of said expanded core layers also being bonded to a respective adjacent outer wall of the vessel in a predetermined linear bonding pattern, whereby the vessel has an internal compartmented cross-bracing core structure comprising double and single tiers of longitudinally extending linear compartments, the double and single tiers alternating with each other in spanwise sequence across the expanded core structure, the double tier comprising compartments having trapezoidal cross-section, and the single tier comprising compartments having hexagonal cross-section.

A vessel according to the invention may comprise at least two sets of compartments, the compartments within each set being connected internally of the vessel for mutual gas exchange, but in which there is no such connection between the different sets, each set of compartments being connected to different inlet/outlet means. Such a design will be of particular use in situations where two or more different gases must be stored, or where the same gas must be stored at two or more different pressures.

The invention also includes a manufacturing process for a gas storage vessel, comprising the steps of diffusion bonding a sandwich of at least three sheet metal layers across their interfaces at selected locations in predetermined patterns, then superplastically blow forming the internal structure of the vessel, as defined by the predetermined patterns of diffusion bonding between the layers, to produce a superplastically expanded core structure of the vessel for containing the gas.

If blocks of gas adsorbent material are to be inserted into linear compartments extending longitudinally of the vessel, the manufacturing process can further comprise the additional steps of removing an end portion of the vessel thereby to expose the expanded core structure of the vessel, inserting gas adsorbent material into the expanded core structure, and sealing the open end of the vessel by joining a closure piece thereto. The closure piece may be the previously removed end portion of the vessel, and may be welded or bonded into position. Such bonding may be by an activated (transient liquid phase) diffusion bonding process if solid state diffusion bonding cannot be used.

The closure piece can be provided with one or more appropriately sized holes (into which can be welded pipes) for charging or discharging the vessel.

BRIEF DESCRIPTION OF THE DRAWINGS

Exemplary embodiments of the present invention will now be described with reference to the accompanying drawings, in which:

FIG. 6 is a perspective view of a further flat gas storage tank having a different type of internal bracing from that shown previously and illustrating its adaptation to enable it to be filled with blocks of a gas adsorbent medium;

DETAILED DESCRIPTION OF THE PREFERRED EMBODIMENT

Figure 1:
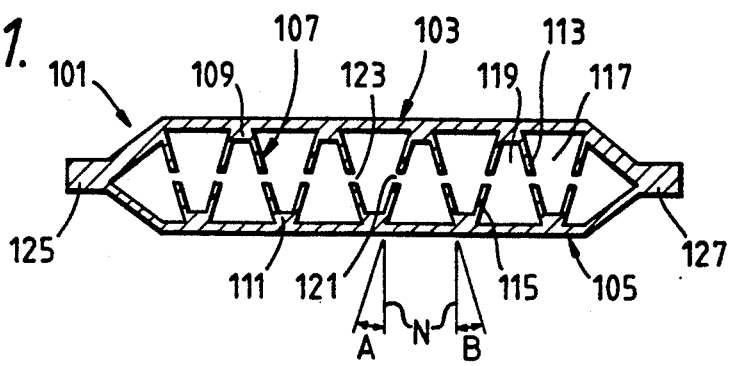
FIG. 1 is a cross sectional side elevation of a flat gas storage tank with an internally braced construction in accordance with the present invention.

Referring to FIG. 1, there is shown a multi-layer sheet metal structure in the form of gas storage vessel or tank 101, consisting of outer skins 103,105 and an internal Warren girder type of cross bracing structure 107 which helps the tank to withstand high internal pressures without the need for excessively thick external walls. In effect, the tank is a three layer sandwich type of construction in which the middle or core layer 107 has been superplastically expanded—after being selectively solid state diffusion bonded to the neighburing outer layers when in the flat state—to form a corrugated sheet with linear corrugations. The areas of diffusion bonding between the sheets when flat are chosen so that in the expanded state the flat peaks of the corrugations are diffusion bonded to the outer skins 103,105 at 109,111, etc., and the sides of the corrugations form regularly spaced slanted webs 113,115, etc. These are at defined angles A,B relative to normals N through the outer skins. Neighburing webs 113,115, etc., define long compartments 117,119, etc., between them. The webs have holes 121,123, etc., in them to allow free passage of gas between adjacent compartments 117,119, etc. The edges 125,127 of the tank 101 have no internal structure (except for gas inlet/outlet ports or pipes as explained later), the three layers being solid state diffusion bonded together to produce a solid metal flange around the periphery of the finished tank. This flange, or most of it, may be trimmed off if desired, but we prefer to retain it as a convenient means of mounting the tank on supporting structure by means of, e.g., bolts passing through the flange into such structure.

Regarding the manufacturing processes mentioned above, superplastic forming and solid state diffusion bonding are well known metallurgical phenomena.

Superplasticity is a deformation phenomenon which allows some metals, when subjected to suitable elevated temperatures, to strain by large amounts without the initiating of tensile instability or necking. This enables the generation of high volume fractions of hollowness in a gas storage vessel, while allowing designs of good mechanical performance, together with low weight and high. utilisation of material.

Solid state diffusion bonding is a metal interface phenomenon in which, provided clean metal surfaces at a suitable elevated temperature are protected from surface contamination by the provision of a suitable joint face environment, and sufficient pressure is applied to the mating surfaces, solid state diffusion of the metal atoms across the boundary takes place to such an extent that subsequently no interface can be detected. No macroscopic deformation takes place during bonding and therefore shape and size stability is maintained during the operation. Furthermore, the joint produced has parent metal properties without the presence of a heat affected zone or contamination by materials such as a flux or bond promoter. Its use within a gas storage vessel therefore reduces the possibility of chemical interaction with the stored gas. The fact that solid state diffusion bonds exhibit the same strength as the parent metal on both sides of the bond line also lends very high strength and resistance to internal pressure to structures in accordance with the present invention.

Given consistent material properties and appropriate superplastic forming conditions, one advantage of the above-outlined production method is that it ensures that the internal Warren girder structure 107 (or such other internal bracing structure as might be chosen to tie the two outer skins 103,105 together) can be exactly and predictably formed to chosen dimensions. Consequently, preformed blocks of gas adsorbent material, such as activated charcoal, can readily be loaded into the internal compartments of the tank 101 between neighburing webs 113,115, etc., in order to fill it completely and thereby increase its gas capacity. In addition, because a close fit between the blocks and the compartments is achieved, rattling and possible block damage due to jolts and vibration is minimised.

A solid state diffusion bonding and superplastic forming process suitable for the manufacture of a tank like that shown in FIG. 1 will now be described in a simplified manner with reference to FIGS. 2A to 2C. For fuller details of such a manufacturing process, reference should be made to our earlier patent applications EP 0414435 A and EP 91304913.6, concerned with heat exchangers.

Figure 2A:
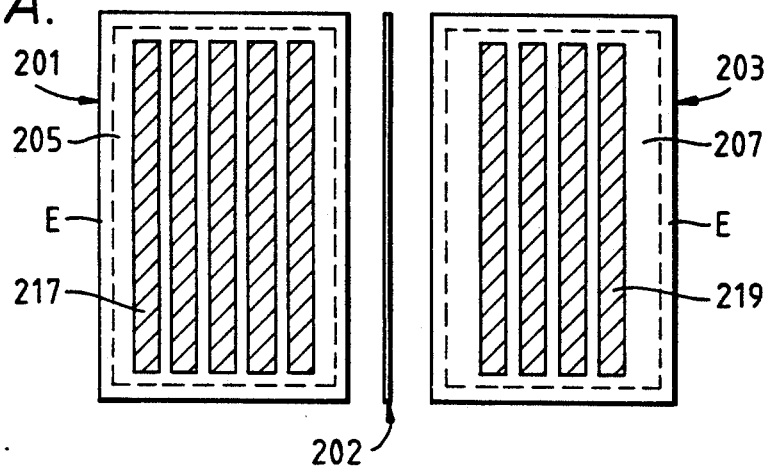
FIGS. 2A to 2E illustrate in cross sectional side elevation processes for manufacturing two types of gas storage tank in accordance with the present invention.

Referring to FIG. 2A, three superplastically formable metal sheets 201,202,203 are illustrated. These three sheets will constitute the three layers of the finished vessel and are to be stacked together for diffusion bonding. The middle or core sheet 202 of the stack is shown edge on, but the two outer sheets 201,203 are shown as plan views of their respective joint faces 205,207, which, when the sheets are stacked together, confront the core sheet 202. The sheets 201,202,203 are made of, say, a suitable titanium alloy, although other superplastically formable alloys such as stainless steel or aluminium alloys can also be obtained if cheaper materials are desired. The sheets are of near net shape and controlled surface finish and are cleaned to a high standard. A bond inhibitor, or so called stop off material, as known, is then deposited onto selected areas 217,219 (shown as shaded) of the joint faces 205,207 of the two outer sheets 201,203. The deposit specifies the ultimate internal configuration of the finished gas storage tank, so that after blow forming at superplastic conditions, the stop off areas 217,219 will produce long straight compartments 229(FIG. 2C) within the tank, these being similar to compartments 117,119, etc., within tank 101 of FIG. 1. The edge regions E of the sheets 201,203, where it is not desired to produce an internal structure, do not have any bond inhibitor applied.

The middle or core sheet 202 is provided with a number of holes (not shown) through its thickness which interconnect the stripes of stop off material 217,219. These are positioned such that after the diffusion bonding and superplastic forming process is finished, they will form holes 227 interconnecting the tank's internal compartments, like the holes 121,123 in FIG. 1. These holes ensure gas permeability of the entire unexpanded internal structure of the stack of sheets. In the finished tank, they allow free passage of gas between adjacent compartments.

Although the internal geometry of the tank is effectively fixed by application of the stop off, the deposition process, e.g. silk screen printing, allows considerable flexibility of design to satisfy both mechanical and internal compartmental shape requirements. The sheets 201,202,203 are then stacked, welded together around their edges, and solid state diffusion bonded together in the manner detailed in our earlier patent applications mentioned above, resulting in a three layer sheet metal bonded stack 221, which is placed in a closed die 223 as shown schematically in cross-section in FIG. 2B. Superplastic forming of the bonded stack 221 into the final shape of the storage tank, complete with its internal structure as shown schematically in FIG. 2C, now occurs. The bonded stack 221 and the die 223 are heated to superplastic forming temperature and the stack's interior structure, as defined by the pattern of bond inhibitor 217,219, is injected with inert gas at high pressure to inflate the stack, as detailed in our earlier patent applications, so that the outer layers 201,203 move apart against the die forms. As the outer layer 201 expands superplastically into the die cavity, it pulls the middle or core layer 202 with it where diffusion bonding has occurred. Superplastic deformation of the core layer 202 therefore also occurs to form a hollow interior which is partitioned by the stretched portions 228 of the core layer 202, thereby creating compartments 229 for gas storage. The edge regions E of the stack 221 remain fully bonded, and therefore flat and unexpanded.

Figure 2B:
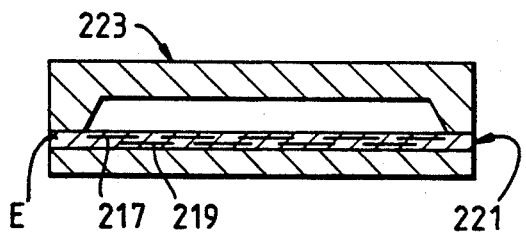
Figure 2C:
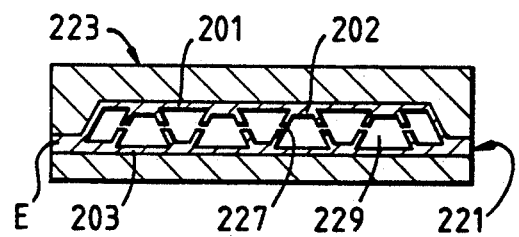

It is convenient for manufacturing purposes if all the sheets 201,202,203 are made of superplastically formable alloy, though in the process shown in FIGS. 2A to 2C, only the sheets 201 and 202 are in fact superplastically formed during manufacture of the element.

After the superplastic forming process has been finished, the article so produced may if desired be trimmed around its edges, say along the dashed line indicated in FIG. 2A. The superplastic forming/diffusion bonding process outlined above results in the production of very accurately formed external surfaces for sheets 201,203, which enable good conformance of the tank to any neighburing surfaces against which it is desired it should fit.

It is within the scope of the invention to produce vessels comprising more than three sheet metal layers. In particular, vessels may be formed with two or more sets of core compartments formed from two or more expanded core layers with similar or differing configurations.

Figure 2D:
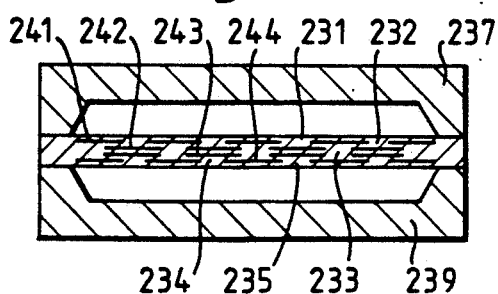
Figure 2E:
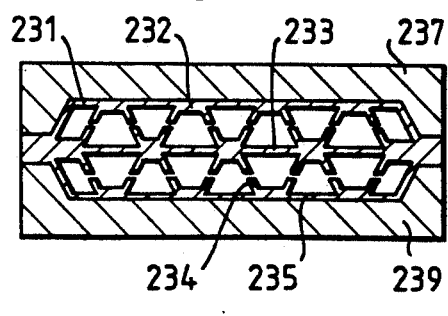

To illustrate extension of the above principles to the production of a vessel having a core structure with more than one tier of core compartments, FIGS. 2D and 2E show the same stages of manufacture as FIGS. 2B and 2C, but for a vessel having two tiers of compartments instead of only a single tier. FIG. 2D shows a diffusion bonded stack of five metal layers placed between superplastic forming dies 237,239. Four stop off stripe patterns 241-244 form the unexpanded interior structure of the vessel and define the pattern of diffusion bonds across the former interfaces between the layer metal layers. After superplastic forming, the vessel comprises two superplastically expanded outer layer metal layers 231,235, with two superplastically expanded core layers 232,234 separated by a further plane layer 233 between them. This middle layer 233 has not been subjected to superplastic deformation.

It will be evident that vessels could be made having more than two superplastically expanded core layers and more than two tiers of core compartments, if this were thought to be desirable.

The compartments within each tier can be interconnected by holes through the webs 234 for free exchange of gas as shown, but the two tiers need not necessarily be connected to each other through the middle layer 233, in which case the two tiers will comprise two separate sets of compartments. In such a case each set of compartments will be provided with its own gas inlet/outlet ports for the manufacturing process and for subsequent use. Such a design will be of particular use in situations where two different gases must be stored, or where the same gas must be stored at two different pressures. Again, the above mentioned patent applications disclose various multi-layer expanded core structures and methods of making them in the context of heat exchanger technology.

One of the features of the superplastic blow forming process is that it can be performed between dies which define the external shape of the tank or other vessel being formed, thus allowing the manufacture of hollow structures with complex external shape. For example, two dimensional or three dimensional curvatures are possible, in structures which retain both the high strength characteristics required for compressed gas storage and the predictability and regularity of the blow formed internal core for insertion of gas adsorbing blocks.

Figure 3A:
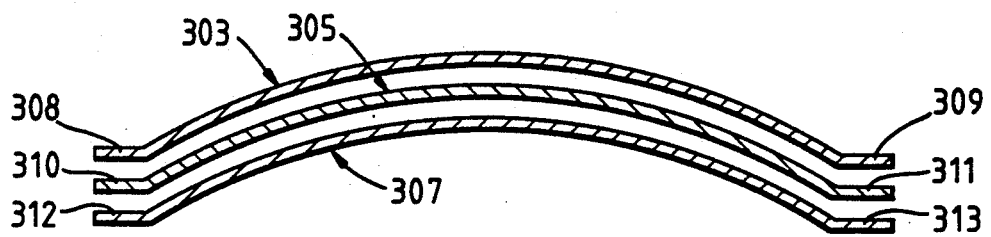
FIGS. 3A to 3C illustrate in cross sectional side elevation the making of a two-dimensionally curved gas storage tank with an internally braced construction similar to that shown in FIG. 1.
Figure 3B:
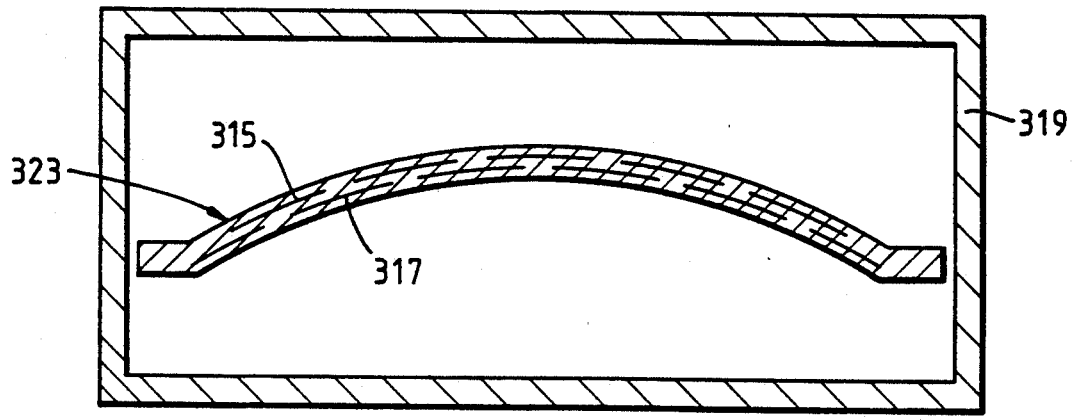
Figure 3C:
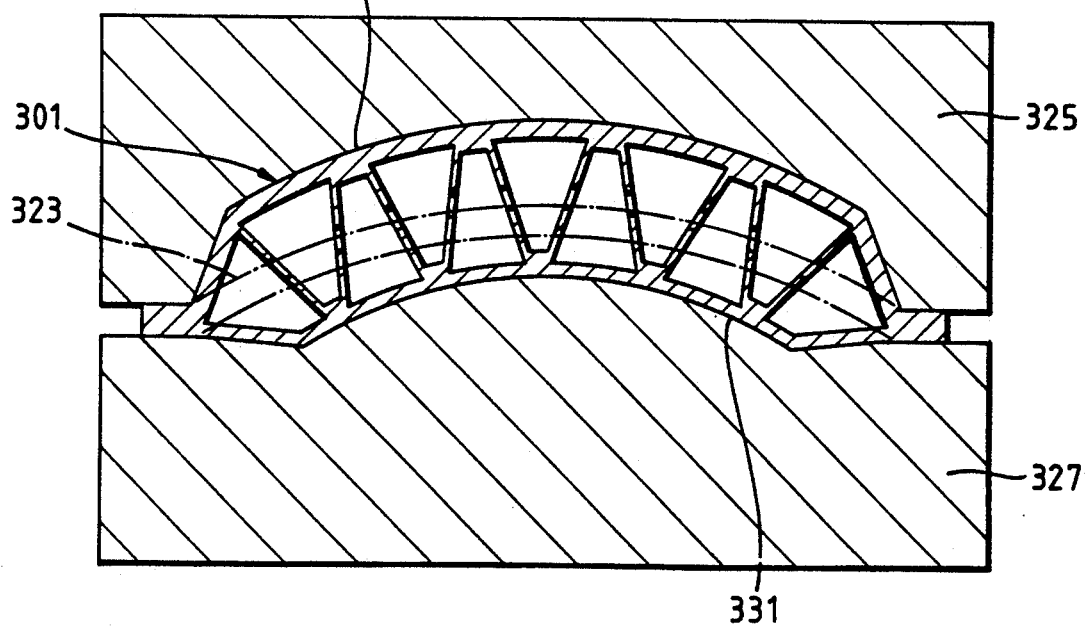

An example of a curved (part-cylindrical) tank 301 formed in the above mentioned way is shown in FIGS. 3A to 3C. Its structure will not be described in detail, since apart from its curvature, which may adapt it to fit more conformably into available space in a vehicle, the structure of the tank 301 is the same as described for tank 101 in FIG. 1.

An exemplary method of making the tank 301 is similar to that recounted in connection with FIGS. 2A to 2C, with divergences due to the difference in finished tank shape which must be produced. The sheets 303,305,307 from which the initial diffusion bonded stack of sheets is made are not flat, but part-cylindrical with plane flanges 308-313 on their longitudinal sides, as shown in FIG. 3A. The stop off coating patterns 315,317 (FIG. 3B) are applied to the convex surfaces of the sheets 305,307 before they are stacked together and seal-welded along their edges. As explained in our previously mentioned patent applications, after purging the stack's interior structure of all volatile and corrosive substances and evacuating it, the stack is then placed in an autoclave 319 and subjected to appropriate temperatures and pressures in a hot isostatic pressing process to produce an internally diffusion bonded pre-form 323 of the tank with an internal structure defined by the stop off patterns 325,317 and any necessary gas permeable connections between discrete areas of stop off. As shown in dashed lines in FIG. 3C, the diffusion bonded stack 323 is then clamped between a pair of heated dies 325,327 whose die surfaces 329,331 define the final shape of the finished tank 301. The preform's structure is expanded to its final shape superplastically by injection of high pressure inert gas in a similar way to that already mentioned in connection with FIG. 2C.

As mentioned earlier, diffusion bonded superplastically formed tank structures in accordance with the invention are manufactured with a solid state diffusion bond around their edges as a seal, see, e.g., edges 125,127 in FIG. 1 and edges E in FIG. 2. In our preferred manufacturing methods, these solid edges are penetrated laterally by one or more small passages for gas ingress and egress to the stack's internal stop off pattern to facilitate the diffusion bonding and superplastic blow forming phases of manufacture. Hence, after the seal welding of the edge of the stack and before diffusion bonding, a small diameter pipe is hermetically joined into the outer end of the or each such passage of the seal welded stack for convenience in enabling application of suction from a vacuum pump and purging of the interior of the stack from contaminants by injection of inert gas. After diffusion bonding, the pipe or pipes are removed and replaced by a similar pipe or pipes to enable further purging, followed by injection of gas at high pressure and consequent inflation of the internal structure of the stack to blow form the tank between the dies shown in FIGS. 2B or 3C.

Figure 4:
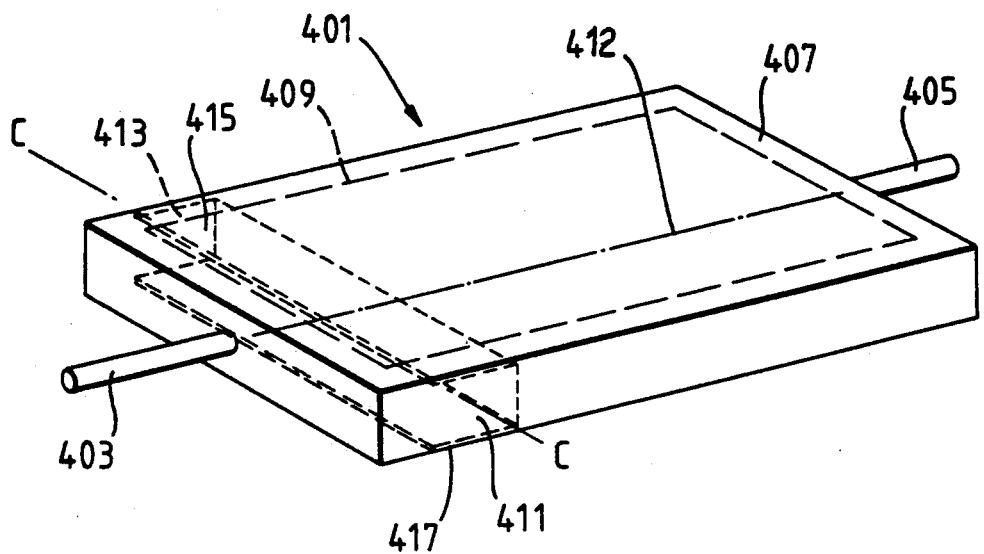
FIG. 4 is a simplified perspective view of a flat rectangular gas tank in the as manufactured state.

FIG. 4 shows diagrammatically a simple flat rectangular tank 401 after the superplastic blow forming operation and with two gas injection pipes 403,405 for that operation still attached to its solid diffusion bonded edges 407. The internal boundaries of the solid edges are shown as dashed line 409, and the blow formed compartments within those boundaries have their longitudinal axes extending parallel to chain dashed line 412. Other arrangements in terms of the external shape of the tank 401 and the number and position of the pipes are of course possible, depending on design requirements.

When a tank such as tank 401 is used for storage of compressed gas without the aid of an adsorbent medium, the the interconnected compartments within the tank can be filled with gas at a high pressure, say up to 200 bar. Filling and emptying of the tank may therefore easily be accomplished through the pipes 403,405 which have already been used during the superplastic blow forming process. All that is required is that the pipes are provided with any necessary end fittings, pressure relief valves, isolation valves, gas flow control valves and filters for connection of the tank into a compressed gas line for either filling the tank with gas or supplying gas from the tank. Any pipes which are not required for passage of incoming or outgoing gas can be cropped at the edge of the tank and a plug welded into the resulting hole.

Alternatively, it would be possible to crop off all pipes used in the manufacturing process and either bore out the resulting holes in the edges of the tank to a larger diameter, or else plug the holes and bore new smaller diameter holes for the new pipes. Such steps may be necessary, e.g., if the pipes required for filling or emptying the tank are of larger or smaller diameter than those required for injection of gas in the superplastic forming process.

If a tank such as tank 401 is used in an adsorbed gas storage system, the gas is stored within the tank at moderate pressures of, say, up to about 40 bar. However, relative to its capacity at the same pressure but without an adsorbent medium in the tank, the capacity of the tank is much increased by the presence of the adsorbent medium. The adsorbent medium can conveniently take the form of briquettes, the internal structure of the tank being designed to accommodate them as previously discussed. In order to insert the adsorbent medium and subsequently reseal the tank, further manufacturing operations are required. An example of such operations is shown with reference to FIGS. 4 and 5.

Firstly, the tank is cropped at one end of its internal compartments as indicated by the line C—C in FIG. 4. The cut is made at a longitudinal position inboard of the solid diffusion bonded edge 407 of the tank.

Secondly, a portion of the internal structure, together with the adjoining side wall portions 411,413, is machined away from between the top and bottom skins 415 and 417 as indicated by the dotted lines. This process leaves the top and bottom skins 415,417 intact, as shown in FIG. 5.

At this stage, any pipes still attached to the tank from the manufacturing process (assuming they are not going to be used for filling or emptying of the tank), are removed and the holes are sealed with plugs welded in place. The internal compartments 419 having been exposed to their full widths and heights, the adsorbent medium in briquette form can now be inserted into the compartments, completely filling them.

Figure 5:
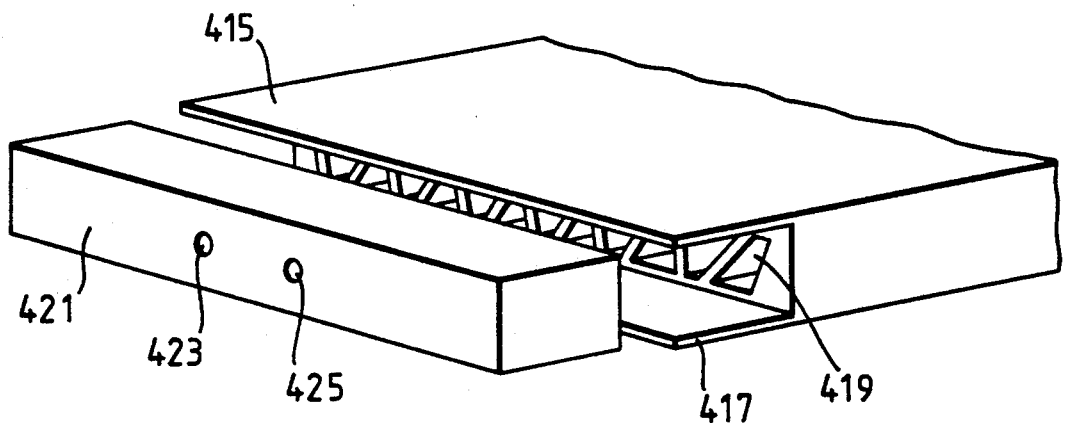
FIG. 5 is a similar view to FIG. 4, but illustrating further stages in the manufacturing process for production of a flat rectangular gas tank which is to be filled with blocks of a gas adsorbent medium.

The final operation, as indicated in FIG. 5, is to seal the open end of the fuel tank by inserting a closure piece 321 sized to fit closely into the gap which was machined between the top and bottom skins 415,417 of the tank. The closure piece 421 is of course otherwise the same size, shape and composition as the material which was previously removed, and is fusion welded or bonded into position. Bonding may be by an activated diffusion bonding process for strength.

Closure piece 421 can be provided with appropriately sized holes 423,425 into which can be welded pipes for filling or emptying the tank.

Clearly, a diffusion bonded superplastically formed tank which has been modified as shown with reference to FIGS. 4 and 5, will not be able to withstand such high internal pressures as one left in its unmodified condition. However, in terms of increased gas storage capacity, the presence of the adsorbing medium in the tank will more than make up for this reduced mechanical strength.

The above description has concentrated on vessels having expanded core structures which give internal bracing of the Warren girder type. However, particularly where it is not desired to insert blocks of adsorbent material into the core structure, many other configurations may be adopted for the core layer. For instance, in the patent applications in the field of heat exchangers which were mentioned above, there is disclosed a type of superplastically expanded core layer in the form of a sheet having regularly spaced upstanding peaks extending from both its sides. The peaks are of substantially circular cross section normal to their extension and their tips are solid state diffusion bonded to the neighburing layer, the bases of the peaks on any one side of a sheet being situated centrally between the bases of adjacent peaks on the opposing side of the sheet. Also disclosed are solid state diffusion bonding and superplastic blow forming processes for making them. Such a configuration for the core layer may be advantageous in terms of rigidity of the vessel and its resistance to internal pressurisation.

As an example of a vessel made from four sheet metal layers, FIG. 6 shows a fully formed flat gas storage tank 601 with its end 602 removed to reveal the internal compartmented cross-bracing structure. This comprises top and bottom longitudinally extending compartments 603,603' of trapezoidal cross-section, inter-digitated with hexagonal compartments 605. The compartments are formed from a core layer comprising two selectively diffusion bonded and superplastically formed membranes 607,609. This structure is particularly preferred as best mode of putting the invention into practice. The relative dimensions of the sides of the compartments 603,603',605 can of course easily be varied as desired according to the stop off pattern adopted in the initial stage of manufacture.

The end 602 of the tank 601 has been removed to allow the insertion of activated carbon briquettes, one of which is illustrated in full lines at 611. The briquettes are inserted one after the other into the compartments 603,603', as indicated by the arrow, until each compartment is full. The hexagonal cross sectional shape of compartments 605 is such that two trapezoidal briquettes 611 and 612 can be stacked together, as indicated by the dashed lines of briquette 612, and slid into the compartments 605 until they are full.

After insertion of the briquettes into the tank 601, the cut faces 613,615 of the main body of the tank 601 and the separated end portion 602 are prepared for rejoining. The rejoining operation can be accomplished by a high integrity process such as tungsten/inert gas arc (TIG) welding or transient liquid phase (activated) diffusion bonding.

To facilitate charging or discharging of the tank 601 with gas at high pressure, end portion 602 of the tank is fitted with a small diameter high integrity stainless steel or titanium alloy pipe 617. This is welded or otherwise securely and sealingly joined into the end of a small hole 618 which connects with the tank's internal structure. Pipe 617, or at least the passage 618 leading to the interior of the tank through the diffusion bonded edge flange, may have already been used for injecting inert gas at high pressure to achieve superplastic forming of the tank during the manufacturing process. If desired, the tank is now ready for installation in a vehicle or other situation requiring a source of highly pressurised gas.

To control charging and discharging of the tank, the free end of the pipe 617 must be connected to the outlet of a valve module 619 containing a control valve, an isolation valve and a pressure relief valve. Valve module 619 receives gas from a disconnectable supply pipe 621. After filling the tank 601 to a high pressure, the isolation valve-in module 619 is closed, pipe 621 is disconnected, and the tank is ready for connection of the valve module 619 to a further pipe for controlled supply of the contents of the tank 601 to a combustion engine or other process requiring it.

Manufacture of a tank like that shown in FIG. 6 proceeds on similar lines to that described in relation to FIGS. 2A to 2C, and will be summarised with reference to FIGS. 7A to 7D.

Figure 7A:
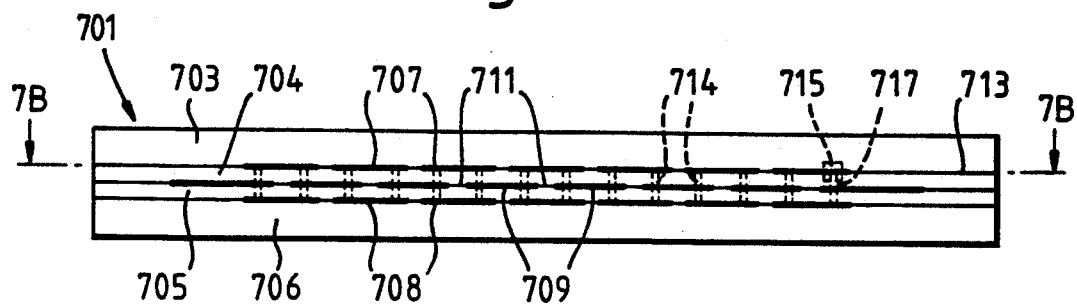
FIGS. 7A to 7D illustrate stages in the manufacture of a tank similar to that shown in FIG. 6.
Figure 7B:
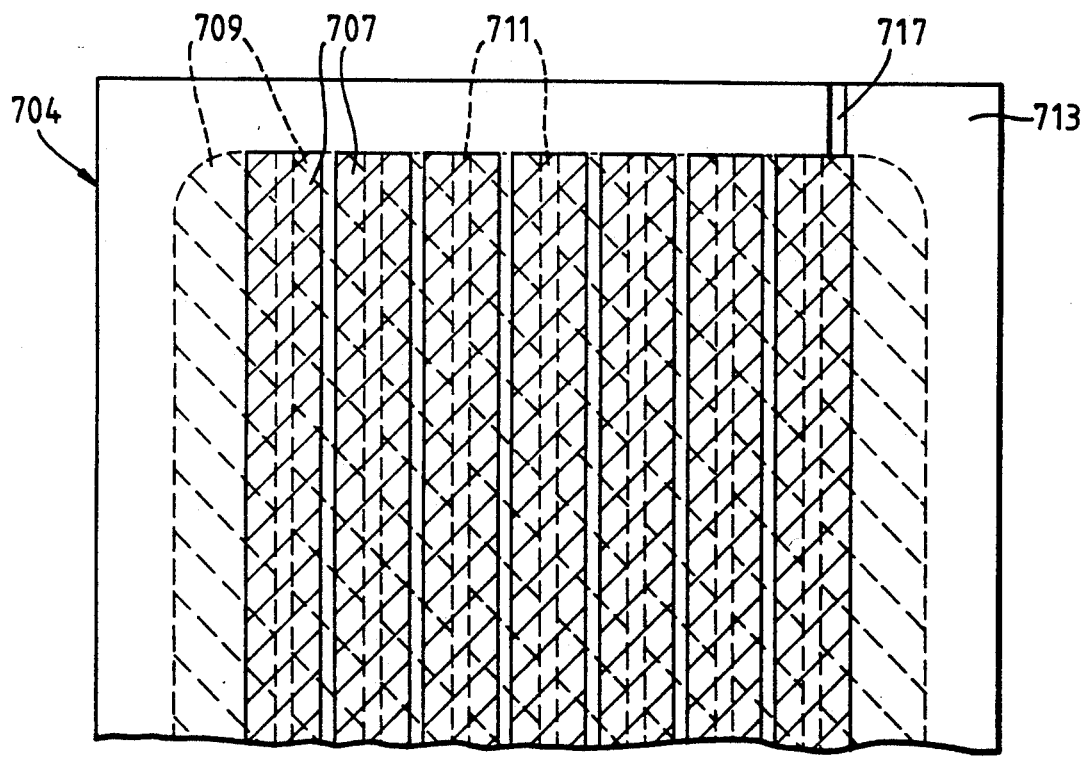

Referring first to FIGS. 7A and 7B, FIG. 7A is a cross-sectional side elevation of a stack 701 of four flat metal sheets 703-706, its vertical scale being much exaggerated relative to the horizontal scale. FIG. 7B is a cross section taken along line 7B—7B in FIG. 7A, this being the joint line between sheets 703 and 704.

The stack 701 comprises two relatively thick outer sheets 703 and 706, and two thinner core sheets 704,705, which will later form the core compartments of the tank. The upper surfaces of core sheet 704 and outer-sheet 706 are both coated with similar patterns 707,708 of equally spaced stripes of stop off material, whereas the upper surface of core sheet 705 is coated with a further pattern 709 of equally spaced stripes of stop off material. It will be noticed that in this example the stripes of the patterns 707,708, and 709 are all of the same width, because of the relative dimensions of the internal compartments it is desired to produce within the tank, but the stripes of patterns 707 and 708 straddle the gaps 711 between adjacent stripes in pattern 709. As will be seen from FIG. 7B, a border portion 713 of sheet 704, and of sheets 705 and 706, remains uncoated by the patterns of stop off material so that a solid metal frame will surround the internal structure of the diffusion bonded stack as a result of the diffusion bonding process.

Evacuation of air and volatiles from the internal structure of the seal welded stack prior to diffusion bonding, and subsequent injection of gas for superplastic forming to final tank shape, is achieved through a pair of small cooperating grooves 715,717 which extend in registration with each other across the edge portions 713 of the under side of the top outer sheet 703 and the upper side of the top core sheet 704, respectively, to connect with the end of a stripe of the stop off pattern 707. After seal welding of the edges of the stack 701, the external end of the small hole formed by these two grooves 715,717 is counterbored and a small diameter gas pipe is welded into position before preparation for diffusion bonding begins. This arrangement for gas ingress or egress is applicable to the other embodiments already described. It can be duplicated at one or more other points around the periphery of the stack at the option of the designer.

It is of course important during the diffusion bonding and superplastic forming processes that there are effective gas permeable connections between the stripes in the stop off patterns 707,709. To facilitate this, small diameter holes 714 (shown only as broken lines in FIG. 7A) are provided in the two core sheets 704,705 before they are stacked together. These may be situated at the ends of the stripes, and/or at any intermediate positions, to interconnect edge portions of the stripes in stop off patterns 707,708,709 which are in vertical registration with each other. Note that the pattern of holes 714 shown is also effective to interconnect all the longitudinal compartments in the finished tank, because the holes are in those portions of the core sheets 704,705 which after superplastic forming comprise the partitions between adjacent compartments.

After fixing of the pipe or pipes into the edge of the stack to connect with the stop off patterns 707-709, and after appropriate bake-out, purging and evacuation of volatile and gaseous contaminants from the interior structure of the sealed stack 701, it is diffusion bonded together by the usual hot isostatic pressing process, as previously discussed. After this process is complete, it is necessary to fit a new gas pipe into the end of the gas ingress/egress hole formed by the grooves 715,717 (FIGS. 7A and 7B) in the edge of the diffusion bonded stack.

Figure 7C:
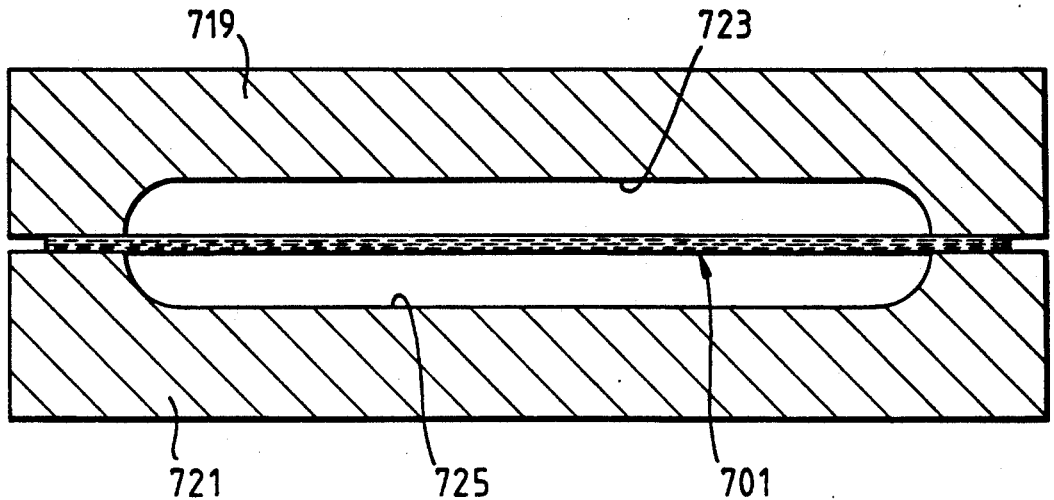
Figure 7D:
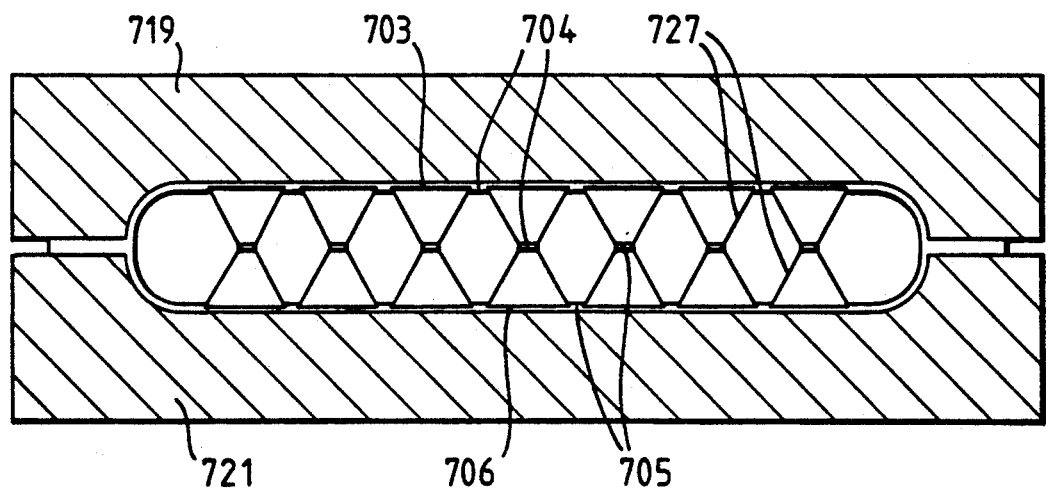

The next stage of manufacture is shown in FIGS. 7C and 7D, where the diffusion bonded stack 701 is clamped at its edges between dies 719,721, whose die faces 723 and 725 reproduce the finished external shape of the tank to be blow formed in the dies. The unexpanded interior structure of the diffusion bonded stack is first purged with inert gas to prevent possible corrosion of the interior structure of the tank by oxygen or water vapor at the elevated temperatures used for superplastic forming. Die temperature is then raised until the stack 701 is at the correct temperature for superplastic forming. This is chosen as known for the particular material selected for the tank structure. Inert gas at high pressure is next injected into the interior of the stack in a controlled manner to first slightly inflate all of the interior structure formed by the stop off patterns and then blow form the tank to its finished shape, as shown in FIG. 7D. During the blow forming process, superplastic deformation occurs of the portions 727 of the core layers 704,705 which are not diffusion bonded to each other or the outer layers 703,706. The superplastically deformed portions 727 comprise webs which divide the interior of the finished tank into the regularly shaped compartments which can receive activated carbon briquettes as mentioned in connection with FIG. 6.

The following data are exemplary of the characteristics of a relatively light weight but robust tank like the above preferred embodiments of FIGS. 6 and 7 when made of the well known superplastically formable alloy Ti-6Al-4V (ultimate tensile strength 927MPa).

Minimum width of fully diffusion bonded edge flange (after trimming) . . . 5.0 nun Core web 0.5 proof stress after 100% superplastic strain . . . 417 MPa Ratio of diffusion bond area between core web and tank shell to total internal surface area of tank shell . . . less than 1/7

Approx. storage volume per square meter of cavity area . . . 85 ltr

Approx weight per square meter of cavity area . . . 50 kg

Nominal internal pressure capability at 25° C., with safety factor of 1.333 (assuming insertion of activated carbon blocks in core compartments and rewelding) . . . 40 bar It should be noted that despite the relatively small bonding area between the reinforcing core web and the shell of the tank, the tank provides a very good pressure capability, even though the structure has been cut and rewelded for insertion of the carbon blocks. This is due to the parent metal strength qualities of the bonds produced by the solid state diffusion bonding process used in production of the tank.

What is claimed is:

1. A multi-layer sheet metal structure including at least one superplastically expanded sheet metal core layer, the structure having predetermined patterns of solid state diffusion bonds between adjacent sheet metal layers, the at least one expanded core layer defining a plurality of compartments within the structure and internally bracing the structure to provide said structure with high resistance to deformation, the structure being for use as a compressed gas storage vessel, wherein the compressed gas is stored in the compartments, the structure having passage flow means in flow communication with the compartments to facilitate charging and discharging of the structure with the compressed gas, said one expanded core layer comprising longitudinally extending linear compartments containing blocks of gas adsorbent material conforming to the cross sectional shape of the compartments.

2. A compressed gas storage vessel comprising a multi-layer sheet metal structure including at least one superplastically expanded sheet metal core layer, the structure having predetermined patterns of solid state diffusion bonds between adjacent sheet metal layers, the at least one expanded core layer defining a plurality of compartments within the vessel for containing the compressed gas and internally bracing the structure to enable said structure to withstand internal pressurization, the vessel having passage flow means in flow communication with the compartments to facilitate charging and discharging of the vessel and the compressed gas, said at least one expanded core layer comprising longitudinally extending linear compartments containing blocks of gas adsorbent material conforming to the cross sectional shape of the compartments.

3. A compressed gas storage vessel according to claims 1 or 2, having two superplastically expanded core layers separated by a further sheet metal layer situated therebetween.

4. A manufacturing process for a gas storage vessel, comprising the steps of diffusion bonding a sandwich of at least three sheet metal layers across their interfaces at selected locations in predetermined patterns, then superplastically blow forming the internal structure of the vessel, as defined by the predetermined patterns of diffusion bonding between the layers, to produce a superplastically expanded core structure of the vessel for containing gas, removing an end portion of the vessel to expose the expanded core structure, inserting gas absorbent material into the expanded core structure, and sealing the open end of the vessel by joining a closure piece thereto.

5. A manufacturing process in accordance with claim 4, the closure piece being the previously removed end portion of the vessel.

6. The manufacturing process as claimed in claim 4, including providing a diffusion bond area having a ratio of bond area to the total surface of the bonded surface which is less than 1:7.

7. The manufacturing process as claimed in claim 4, which includes providing a ratio of less than 1:7 from the diffusion bond area which is between the at least one superplastically expanded core layer and the adjacent sheet metal layers defining a vessel shell to the total internal surface area of said vessel shell.

8. A multi-layer sheet metal structure including at least one superplastically expanded sheet metal core layer, the structure having predetermined patterns of solid state diffusion bonds between adjacent sheet metal layers, the at least one expanded core layer defining a plurality of compartments within the structure and internally bracing the structure to provide said structure with high resistance to deformation, the structure being for use as a compressed gas storage vessel, wherein the compressed gas is stored in the compartments, the structure having passage flow means in flow communication with the compartments to facilitate charging and discharging of the structure with the compressed gas, said vessel comprising at least two sets of compartments, the compartments within each set being connected for mutual exchange, but in which there is no such connection between the different sets, each set of compartments being connected to different passage flow means.

9. A compressed gas storage vessel comprising a multi-layer sheet metal structure including at least one superplastically expanded sheet metal core layer, the structure having predetermined patterns of solid state diffusion bonds between adjacent sheet metal layers, the at least one expanded core layer defining a plurality of compartments within the vessel for containing the compressed gas and internally bracing the structure to enable said structure to withstand internal pressurization, the vessel having passage flow means in flow communication with the compartments to facilitate charging and discharging of the vessel with the compressed gas, said vessel comprising at least two sets of compartments, the compartments within each set being connected for mutual gas exchange, but in which there is no such connection between the different sets, each set of compartments being connected to different passage flow means.

10. A multi-layer sheet metal structure including at least one superplastically expanded sheet metal core layer, the structure having predetermined patterns of solid state diffusion bonds between adjacent sheet metal layers, the at least one expanded core layer defining a plurality of compartments within the structure and internally bracing the structure to provide said structure with high resistance to deformation, the structure being for use as a compressed gas storage vessel, wherein the compressed gas is stored in the compartments, the structure having passage flow means in flow communication with the compartments to facilitate charging and discharging of the structure with the compressed gas, at least one of said compartments in said expanded core layer containing gas adsorbent material.

11. A compressed gas storage vessel comprising a multi-layer sheet metal structure including at least one superplastically expanded sheet metal core layer, the structure having predetermined patterns of solid state diffusion bonds between adjacent sheet metal layers, the at least one expanded core layer defining a plurality of compartments within the vessel for containing the compressed gas and internally bracing the structure to enable said structure to withstand internal pressurization, the vessel having passage flow means in flow communication with the compartments to facilitate charging and discharging of the vessel and the compressed gas, at least one of said compartments in said expanded core layer containing gas adsorbent material.

12. A compressed gas storage vessel according to claim 10 or 11, in which the predetermined patterns of solid state diffusion bonds between adjacent sheet metal layers includes a peripheral edge region in which all the sheet metal layers are diffusion bonded together to form a solid flange extending around the vessel.

13. A compressed gas storage vessel according to claim 12, in which the passage flow means comprises passage means extending through said solid flange.

14. A compressed gas storage vessel according to claim 10 or 11 in which adjacent compartments in the at least one expanded core layer have connection means allowing free passage of gas therebetween.

15. A compressed gas storage vessel according to claim 10 or 11 in which the at least one expanded core layer comprises linear corrugations whose extremities are solid state diffusion bonded to the adjacent sheet metal layers, the sides of the corrugations forming regularly spaced webs extending between the adjacent sheet metal layers at predetermined angles relative thereto, adjacent webs defining long compartments between themselves to contain the gas.

16. A compressed gas storage vessel according to claim 10 or 11 having at least two superplastically expanded core layers defining at least two tiers of compartments over at least part of the extent of the vessel.

17. A compressed gas storage vessel according to claim 10 or 11, in which the ration of diffusion bond area which is between the at least one superplastically expanded core layer and the adjacent sheet metal layers defining a vessel shell to the total internal surface area of said shell is less than 1:7.

18. A compressed gas storage vessel according to claim 14, in which the at least one expanded core layer has opposite sides and comprises regularly spaced upstanding protrusions extending from both said sides, the protrusions being of hollow cross section normal to their extension and their extremities being solid state diffusion bonded to the neighboring sheet metal layers to define compartment means on both sides of the core layer.

19. A compresses gas storage vessel according to claim 14, having two superplastically expanded core layers and two further layers comprising the outer walls of the vessel, the two middle sheet metal layers being diffusion bonded to each other in a predetermined linear bonding pattern and each of said expanded core layers also being bonded to a respective adjacent outer wall of the vessel in a predetermined linear bonding pattern, whereby the vessel has an internal compartmented cross-bracing core structure comprising double and single tiers of longitudinally extending linear compartments, the double and single tiers alternating with each other in spanwise sequence across the expanded core structure, the double tier comprising compartments having trapezoidal cross-section, and the single tier comprising compartments having hexagonal cross section.

* * * * *